UNITED STATES PATENT OFFICE.

FERNAND BERLIOZ, OF GRENOBLE, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

SERUM PREPARATION FOR MEDICAL USE.

SPECIFICATION forming part of Letters Patent No. 664,378, dated December 25, 1900.

Application filed February 4, 1899. Serial No. 704,466. (No specimens.)

*To all whom it may concern:*

Be it known that I, FERNAND BERLIOZ, professor of the medical school at Grenoble, residing at Grenoble, France, have invented certain new and useful Improvements in Serum Preparations, of which the following is a specification.

This invention relates to a new and improved combination for therapeutical purposes, and particularly for the administration of glycerinated animal extracts.

It is well known that of late years extracts of various healthy animal organs prepared with glycerin have been employed medicinally with a great degree of success in the treatment of various organic diseases of the human system. The large amount of glycerin employed as a vehicle prohibits, however, the administration of these remedies by the rectum on account of severe functional disturbances, and the only other mode of application which has been found to secure the perfect assimilation of the remedy is by subcutaneous injections, which are both painful and somewhat dangerous. Owing to these technical difficulties, it is frequently very difficult or impossible to push the remedy to the extent indicated by the nature of the case. According to the present invention concentrated glycerin extract of the healthy animal organ or organs is combined or compounded with the normal serum of healthy animals, preferably of bullocks and preferably in the proportion of about three parts organic extract to ninety-seven parts of serum. Antiseptics or other suitable medical substances may be added as may seem desirable. The serums thus compounded can be administered by the rectum without any inconvenience to the patient, which is a very great advantage and secures the fullest effect of the remedy, as well as the rejuvenating effect of the serum employed as menstruum.

The normal serum, which is the basis of the new combination, is obtained from bullocks (or other animals) the health of which has been rigorously controlled for one or two weeks and which have been submitted to the tuberculin test. After the bleeding, which is made aseptically by means of the trocar, as is usual in the collection of serum, the animals are removed to the abattoir and only after a satisfactory autopsy has been reported by the veterinary inspector is the blood employed. If the veterinary report with respect to any particular bullock is unsatisfactory, the blood of that bullock is rejected. The separation of the bullock-serum is much more difficult than that of the horse. The clot is less contractile, the serum darker, and takes much longer to clear. It is necessary to keep it for three or four weeks, exposing it to variations in temperature and observing each day the progress of the deposit. When the serum is absolutely clear, it is ready for use. To this normal serum is added the concentrated glycerin organic extracts, preferably three per cent., prepared substantially as follows: The testicles are taken from absolutely-healthy young bulls which have been at least a fortnight under rigorous examination and have passed the tuberculin test, as well as the liver, brain, lung, spleen, or other selected organs of the same or other animals fulfilling all the necessary qualifications as regards health. The selected organs are divided and macerated in glycerin for twenty-four hours at a temperature of about 28° centigrade, then sterilized under a pressure of carbonic acid at sixty atmospheres, and filtered through cones of chemically-pure gelatinous alumina. The liquid composing the extract is then collected in a sterilized receiver and mixed with the normal serum in the proportions above specified. It is of course understood that the most minute precautions must be taken in every stage of these operations and in bottling the products to insure complete asepsy. When these precautions are taken, the serum may be kept indefinitely without loss of remedial strength. It is nevertheless frequently desirable to combine with the serum an antiseptic; but such an antiseptic should be taken as will not coagulate the serum.

What I claim, and desire to secure by Letters Patent, is—

1. As a new product for therapeutical purposes, normal animal serum and glycerin extract of animal organs combined or mixed together.

2. As a new product for therapeutical purposes, a solution consisting of normal animal serum and glycerin extract of animal organs in solution therein.

3. As a new product for therapeutical purposes, ninety-seven parts of normal animal serum and three parts of a glycerin extract of animal organs combined or mixed together.

In witness whereof I have hereunto signed my name in the presence of two subscribing witnesses.

FERNAND BERLIOZ.

Witnesses:
   FELIX JOURDAM,
   FRANCOIS DUREE.